(12) United States Patent
Callaghan

(10) Patent No.: US 7,114,076 B2
(45) Date of Patent: Sep. 26, 2006

(54) CONSOLIDATED TECHNIQUE FOR AUTHENTICATING A USER TO TWO OR MORE APPLICATIONS

(75) Inventor: Patrick J. Callaghan, Vestal, NY (US)

(73) Assignee: International Business Machines Corporation, Armonk, NY (US)

(*) Notice: Subject to any disclaimer, the term of this patent is extended or adjusted under 35 U.S.C. 154(b) by 719 days.

(21) Appl. No.: 10/445,135

(22) Filed: May 23, 2003

(65) Prior Publication Data
US 2004/0236938 A1    Nov. 25, 2004

(51) Int. Cl.
*G06F 1/24* (2006.01)
(52) U.S. Cl. ................ 713/182; 713/185; 713/193
(58) Field of Classification Search ............... 713/182, 713/185, 193
See application file for complete search history.

(56) References Cited

U.S. PATENT DOCUMENTS 5,517,569 A * 5/1996 Clark .................... 380/52
5,559,887 A * 9/1996 Davis et al. ............ 705/68
5,710,887 A * 1/1998 Chelliah et al. ........ 705/26
5,963,924 A * 10/1999 Williams et al. ....... 705/40

\* cited by examiner

*Primary Examiner*—Thomas R. Peeso
(74) *Attorney, Agent, or Firm*—Arthur J. Samodovitz

(57) ABSTRACT

A user of a client computer is authenticated for first and second applications executing in a server. The server authenticates the user for the first application based on a userID and password of the user, and the server returns a token of the authentication to the client computer. The client computer uses the token to request a first function performed by the first application. The user subsequently requests a second function performed by the second application. In response, the client computer determines that the user has not yet been authenticated for the second application and sends a request to the server for an authentication ticket for using the second application. In response to the request for the authentication ticket, the server checks the authentication token. If valid, the server returns an authentication ticket to the client computer. The client computer requests the second function to the server. The client computer request for the second function includes the authentication ticket. The server determines that the authentication ticket supplied with the client request is valid before the second application performs the second function.

18 Claims, 5 Drawing Sheets

CONSOLIDATED TECHNIQUE FOR AUTHENTICATING A USER TO TWO OR MORE APPLICATIONS

The invention relates generally to computer systems, and deals more particularly with a consolidated technique to authenticate a user to a plurality of applications.

Often times, a person needs to use two or more different applications that require separate log-on/authentication of the user, and each such authentication requires the user to furnish a valid userID and password. While each such authentication process is not onerous, it still requires some time and effort.

A Distribute Computing Environment ("DCE") program was previously known which consolidated authentication for multiple applications. Using DCE, a person logs-on once to an authentication program within DCE, using a userID and password. The multiple applications are all "under the umbrella" of this authentication program of DCE, so the single log-on applies for all the applications. Thus, the single log-on allowed the person access to all the applications. While this consolidation technique is effective and efficient, it is only suited where the separate applications do not require separate authentication.

An Enterprise Identity Mapping ("EIM") program was also previously known. EIM allows a user to create data that describes the relationships in an enterprise between individuals or entities (such as file servers and print servers) and the many identities that represent them. In addition, EIM provides a set of APIs that allow applications to obtain information about these relationships. Thus, applications using EIM can use a "single logon" with one identity (in one user registry), and the application can determine which other identity in another user registry represents that same person. This application uses this information to authorize all the identities of the user based on the authentication of one of the identies during the single logon-on. However, it does not satisfy the authentication requirements for other applications in other environments.

Accordingly, a general object of the present invention is to provide a consolidated authentication technique for two or more application that require separate authentication.

SUMMARY OF THE INVENTION

The invention resides in a method, system and program product for a user of a client computer to be authenticated for first and second applications executing in a server. The server authenticates the user for the first application based on a userID and password of the user, and the server returns a token of the authentication to the client computer. The client computer uses the token to request a first function performed by the first application. The user subsequently requests a second function performed by the second application. In response, the client computer determines that the user has not yet been authenticated for the second application and sends a request to the server for an authentication ticket for using the second application. In response to the request for the authentication ticket, the server checks the authentication token. If valid, the server returns an authentication ticket to the client computer. The client computer requests the second function to the server. The client computer request for the second function includes the authentication ticket. The server determines that the authentication ticket supplied with the client request is valid before the second application performs the second function.

According to one feature of the present invention, after the server checks the authentication token and before the server returns the authentication ticket to the client computer, the server grants a privileged function in the server control of a process running the first application. The privileged function creates the authentication ticket for the user if a valid authentication ticket does not currently exist for the user associated with the token.

DETAILED DESCRIPTION OF THE PREFERRED EMBODIMENTS

Figure 1:
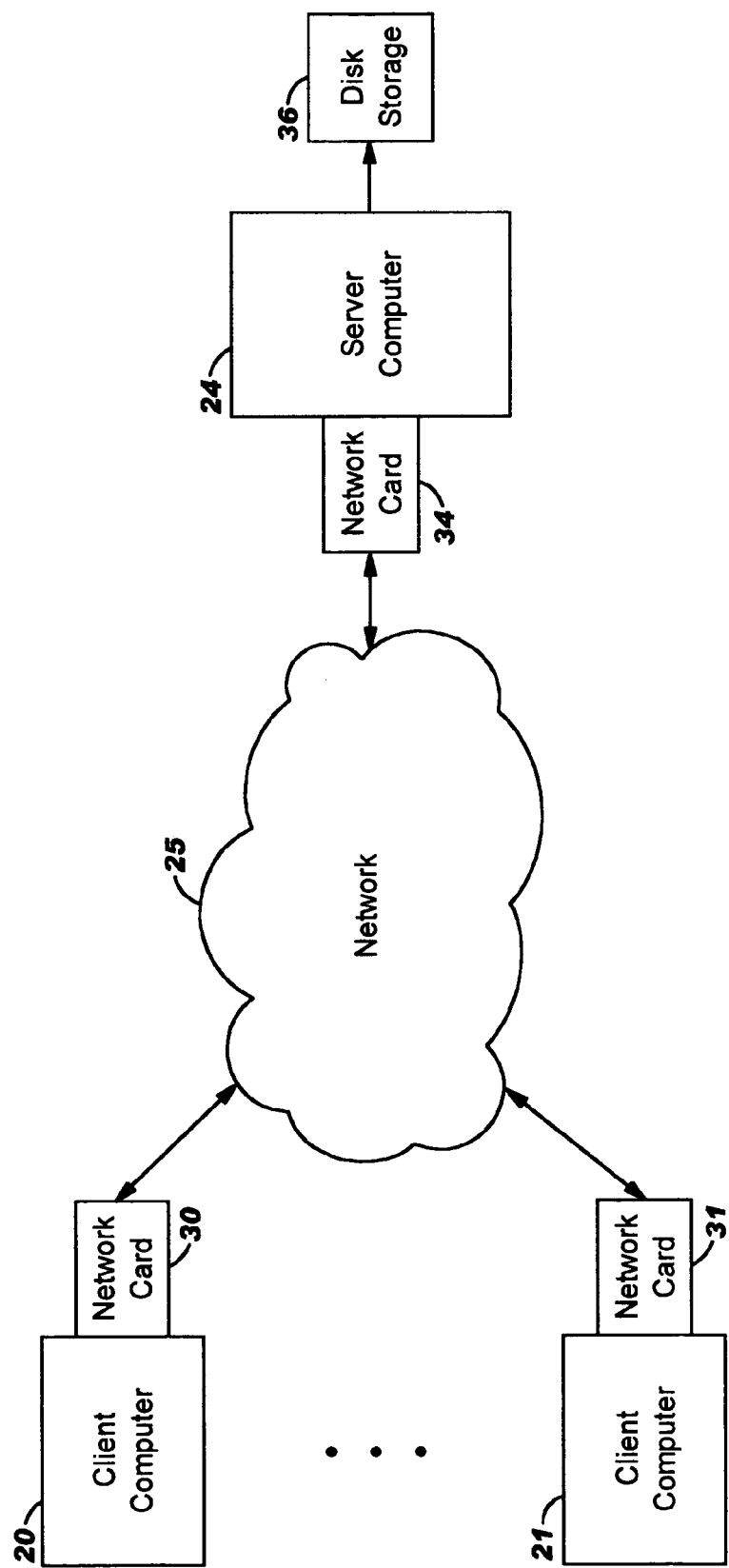
FIG. 1 is a block diagram of a network complex according to the present invention.

Referring now to the drawings in detail wherein like reference numbers indicate like elements throughout, FIG. 1 illustrates a network complex generally designated 10 according to the present invention. Complex 10 comprises a multiplicity of client computers 20, 21, etc., a server computer 24 and a network 25 interconnecting the client computers to the server computer. To permit such interconnection, each of the clients includes a respective network card 30, 31, etc., and the server includes a network card 34. By way of example, network cards 30 and 31 are ethernet adapter cards, token ring adapter cards or analog modem cards, and network card 34 is an ethernet adapter card, token ring adapter card or analog modem card. Also, there is communication hardware such as cables and routers within the network 25 and between the network cards 30 and 31 and the network card 34. A disk storage device 36 is also provided for server 24 to store data bases described below.

Figure 2:
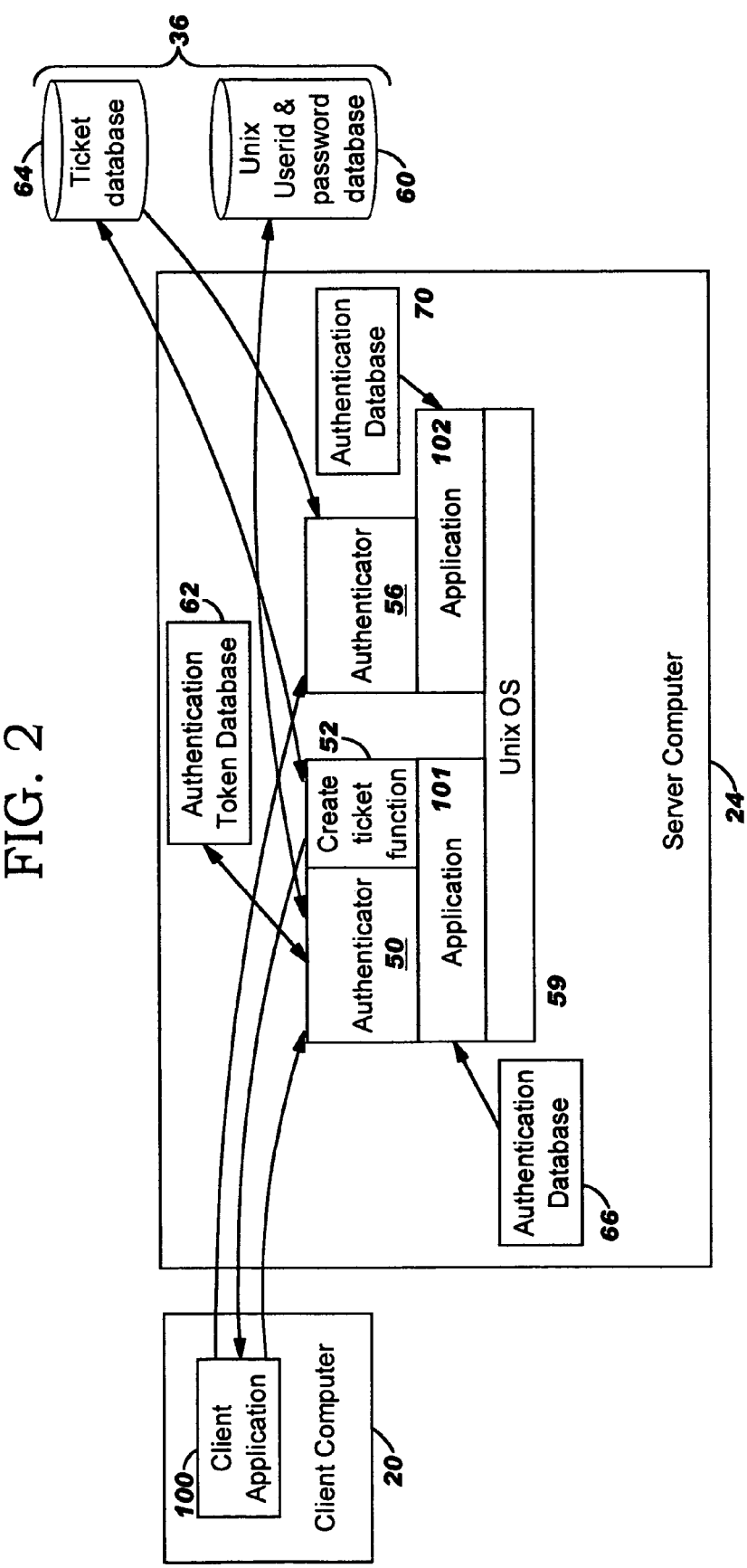
FIG. 2 is a more detailed block diagram of FIG. 1.

FIG. 2 illustrates client 20, server 24 and contents of storage device 36 in more detail. Client 20 includes a client application 100 such as an IBM WebSM client application. Client application 100 interacts with a (human) user of client 20 and with server 24, as described in more detail below. Server 24 includes an operating system 59 such as Linux, or AIX, applications 101 and 102. Server 24 also includes a traditional authentication function 50, associated with application 101, which authenticates the user of client 20 based on the userID and password of the user. The authorized userIDs and passwords are maintained in a database 60 within server 24's disk storage 36. After authentication of the user, the authentication function 50 creates an authentication token for subsequent use by the user to access application 101. Server 24 also includes a new function 52, associated with application 101, which authenticates the user based on the token for access to application 102, and then creates an authentication ticket for the user to access application 102. Function 52 is described in more detail below with reference to FIGS. 3(a–c). Server 24 includes a new authentication function 56, associated with application 102, which authenticates the user for application 102 based on the authentication ticket. Function 56 is also described in more detail below with reference to FIGS. 3(a–c). Both server applications 101 and 102 can read data base 64, whereas only server application 101 can write to data base 64. Only server application 101 can read data base 60. There is no need for server application 102 to read data base 60 for authentication of the user of client 20 because the user's access to server application 102 is not based on a traditional userID and password, as described below. Client application 100 interacts with all functions 50, 52 and 56 as well as applications 101 and 102.

By way of example, server application 101 is an IBM WebSM server application which provides a framework for managing system hardware and software. WebSM provides such functions as adding users, configuring networks, partitioning resources and enabling and disabling resources, although server application 101 can alternately be many other types of server applications. By way of example, server application 102 is an application (such as IBM Common Console Framework (CCFW)) which provides additional/complementary functions for WebSM such as managing a console, analyzing logs, administering firewalls and scheduling operations, although server application 102 can alternately be many other types of server applications.

Figure 3A:
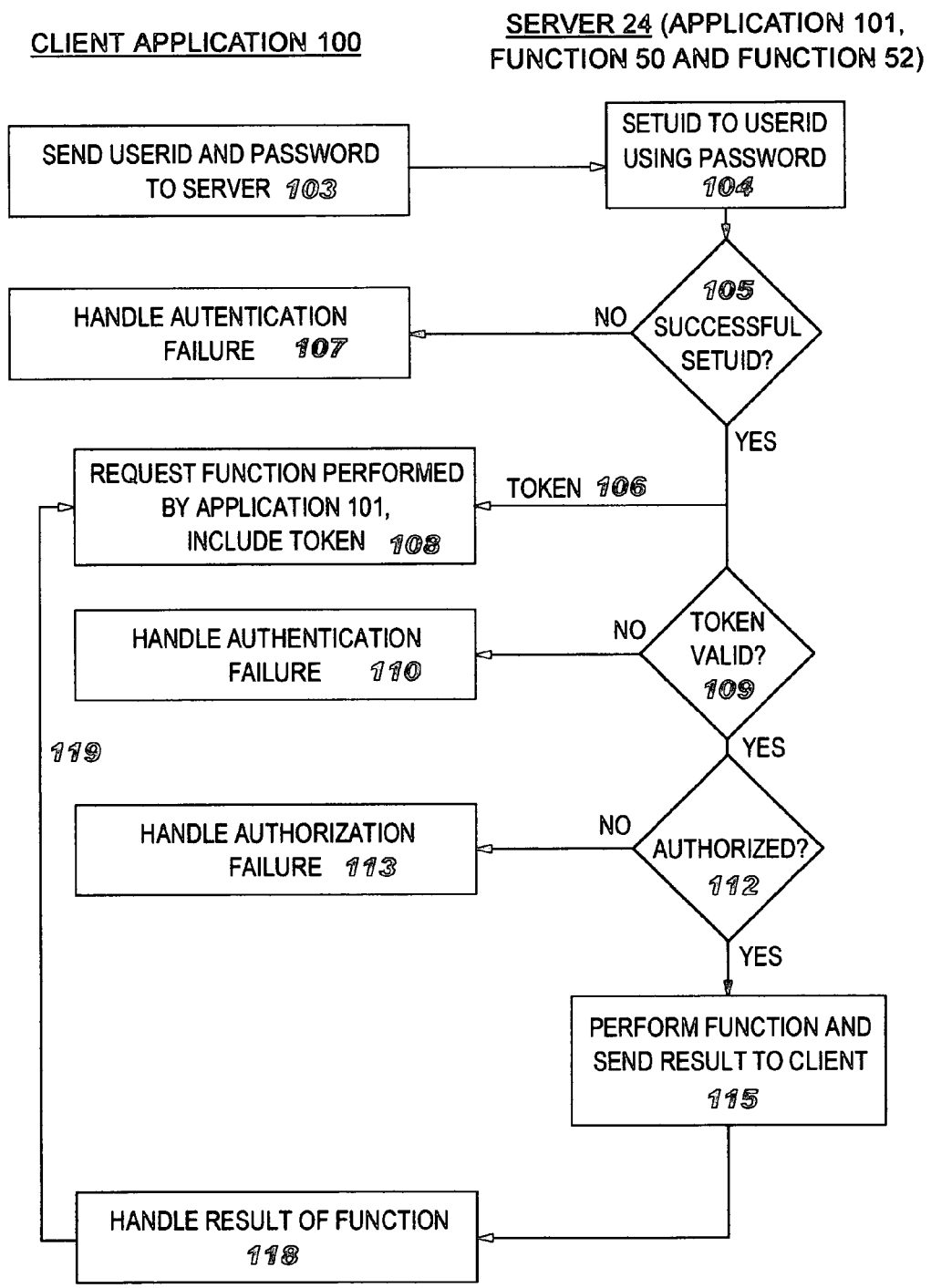
FIGS. 3(a–c) form a flow chart illustrating operation of applications within a client and server of FIG. 2.
Figure 3B:
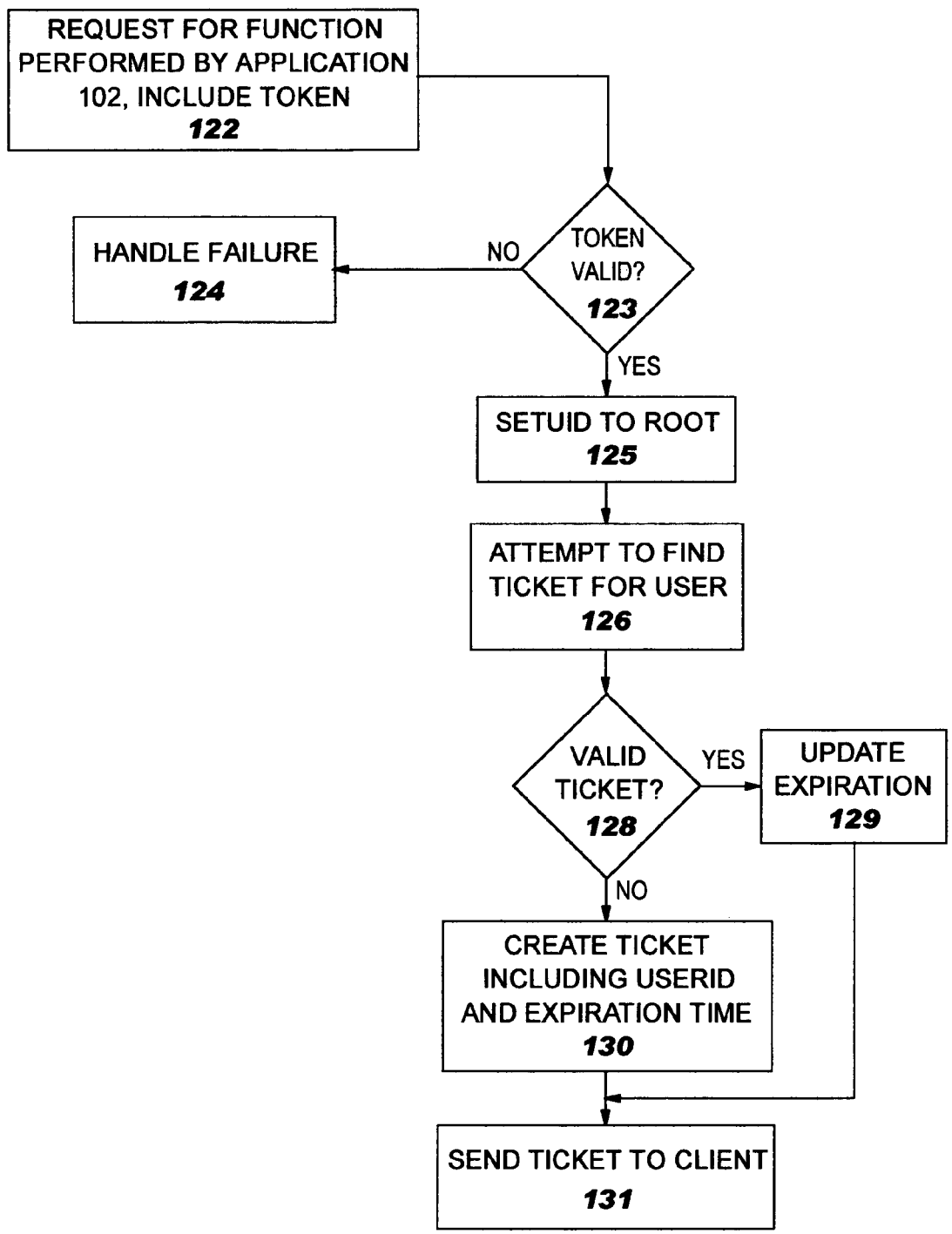
Figure 3C:
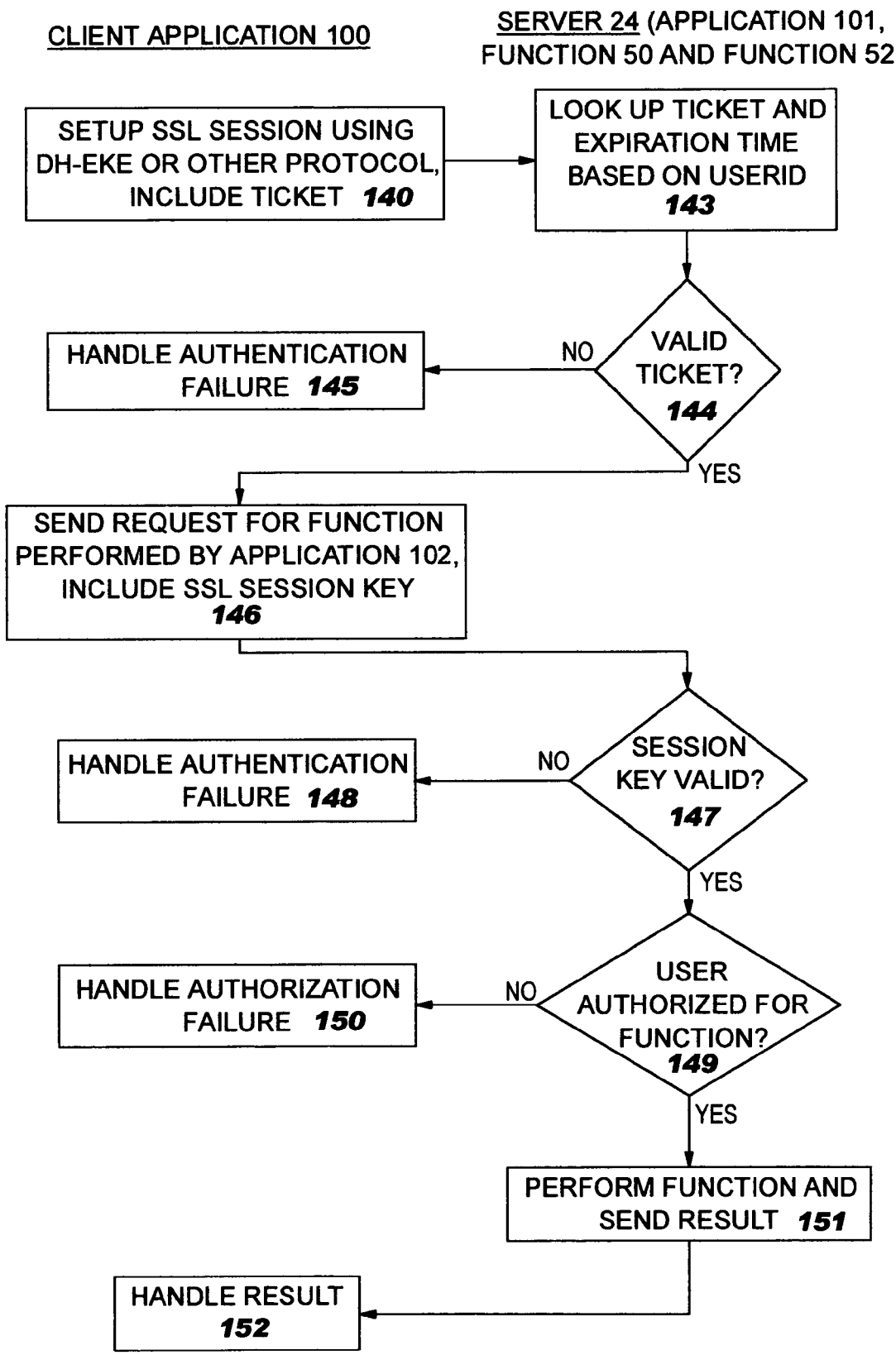

FIGS. 3(a–c) illustrate steps performed by client application 100, functions 50, 52 and 56, server application 101 and server application 102 when the client requests functions performed by both server applications. Initially, a user of client application 100 logs-on to the server application 101. This can occur in at least two traditional ways. One way begins when the user is prompted by server application 101 to send his or her userID and password to server application 101 via client 20 (step 103), and the user complies. Alternately a secure sockets layer ("SSL") connection could be established between the client and the server application 101 before the userID and password are sent to the server application. The SSL connection is used to authenticate the server application to the client so that the client has confidence that it is communicating with the intended server application. (The SSL connection would also provide encryption of the client data sent to the server.) In either case, the authentication function 50 within server 24 has the userID and corresponding password after step 103.

After receiving the userID and password, the authentication function 50 will attempt to authenticate the user as follows. Function 50 performs a "setuid" or similar operation for the specified userID and corresponding password (step 104). The setuid operation is an existing Unix function, however operations similar to setuid can be performed when an operating system other than Unix is used in server 24. The setuid operation begins by comparing the userID and password furnished by the client to valid combinations of userID and password in the data base 60. Then the setuid operation allows the function 50 to designate the user of client 20 as the current owner of a process which is running server application 101. After a successful setuid operation based on a valid combination of userID and password, the user is considered authenticated for access to server application 101. So, the function 50 generates and returns a token of this authentication to the user of client 20 (decision 105 and step 106). The token is also stored in server memory 62 as a temporary portion of data base 62, and used to validate the token subsequently supplied by the client with requests to access application 101. However, if the setuid was unsuccessful, because of an invalid combination of userID and password or otherwise, the client 20 is notified, and the client will notify the user (step 107). The user can try to log-on again with another userID or password.

Assuming the setuid operation was successful, the user of client 20 can then request the server application 101 perform a substantive function such as adding users or configuring networks (step 108). This request will include the authentication token. Upon receiving the request, the server application 101 will check data base 62 to determine if the token is valid (decision 109). If not, a message is returned to the client informing the client of an authentication failure. Upon receiving the message, the client 20 handles the error (step 110). This handling may include a notification to the client, which will prompt the client to log-on again. Referring again to step 108 and decision 109, if the token is valid, server application 101 will determine from (access control list or authorization) data base 66 if the user is authorized to perform the requested function (decision 112). If not, the server notifies the client to handle the failure (step 113), perhaps prompting the user of the client to log-on again. If so, then server application 101 will perform the requested function and furnish the client with the result (step 115). The client may display the result to the user or otherwise handle the result (step 118). The foregoing steps 108–118 can be repeated multiple times as requested by the user (as indicated by branch 119).

Some time later, the user of client 20 requests another function such as analyzing logs, administering firewalls or scheduling operations, and specifies this request to client 20 (step 122). The user may or may not know that server application 102 is responsible for performing this other function or whether the user has been authenticated for application 102. However, the client knows that application 102 is responsible for performing this function, and that that this user has not yet been authenticated for application 102. So, instead of sending the function request to application 102, the client 20 sends to the create ticket function 52 a request to create an authentication ticket for the user to access application 102. The authentication ticket is acceptable by authenticator 56 for use as a password. This request for an authentication ticket includes the user's authentication token previously provided to the client 20 by server application 101 in step 106. The create ticket function then calls authentication function 50 to validate the token by comparison to data base 62 (step 123). If the token is not valid, a message is returned to the client 20 informing the client of the authentication failure. The client may display the failure to the user or otherwise handle the problem; perhaps by asking the user of the client to login again. However, if the token is valid, control is returned to the create ticket function 52. The create ticket function performs a setuid operation to a privileged/supervisor user such as the "root" userID within server 24 (step 125). The "root" userID is a Unix supervisor userID which has a high level of privilege on the Unix server. The setuid operation designates the "root" userID as the owner of the process running the create ticket function 52. The create ticket function will then read data base 64 to determine if there is an existing authentication ticket in the database for the user's userID, i.e. the owner of the process running server application 101 before the setuid operation was performed in step 125 (step 126). (In the illustrated embodiment, only the "root" userID and the effective userID of server application 101 can read the authentication ticket data base, and only the "root" userID can write to it.) If there is such an authentication ticket and it has not yet expired (decision 128), then the create ticket function will update the existing entry by setting the expiration time to be that of the current time (as measured by server 24) plus a predetermined increment (step 129). The increment, such as five minutes, will extend the expiration time to allow the user time to utilize server application 102. Referring again to decision 128, if there is no existing authentication ticket for the user's userID or it has expired, then the create ticket function will write a new ticket into the database 64 for the client user's userID along with an expiration time of, for example, five minutes (step 130). The alphanumeric for the authentication ticket is generated randomly. Next, the create ticket function 52 sends the authentication ticket to the client 20 (step 131).

Upon receiving the authentication ticket, the client 20 establishes an SSL session with the authentication function 56 and server application 102 using the client's userID and authentication ticket as a password (step 140). (Although not integral to the present invention, the Diffie Hillman Extended Key Exchange ("DH-EKE") protocol can be used. This protocol allows for client and server authentication using the same ticket on the client side and the server side. However, the DH-EKE protocol does not allow the sending of the ticket from the client to the server or vice versa, to preserve the confidentiality of the ticket in case the actual recipient is not the intended recipient. However, after successful message exchanges, each side knows that the other side knows the same ticket. If the client and server do not know the same ticket, the message exchange will fail.) It should be noted that the establishment of this session and the furnishing of the authentication ticket can be done transparently to the user of client 20, i.e. the user of client 20 does not have to furnish the authentication ticket, the user's userID or password. The authentication function 56, as part of the DH-EKE protocol, attempts to find a valid ticket entry in the database 64 to match the userID that was just received from the client in the SSL session (step 143). The authentication ticket will be used as the password for the DH-EKE protocol. If authentication function 56 does not find such an entry in data base 64 or finds an entry which has expired (decision 124), then it causes the SSL session set up to fail and notifies the client 20 (step 145). The client 20 may display the failure to the user or otherwise handle the failure.

Referring again to decision 144, if the authentication function 56 finds a valid authentication ticket in the database, and the SSL session is successfully established, then client 20 sends, on the SSL session, a request to server application 102 to perform the function requested by the user in step 122. Server application 102 uses the SSL session to receive the function request. If the function request is not in a recognizable form (decision 147), then server application 102 assumes that the client 20 does not have the appropriate SSL session key and server application 102 returns an error to the client 20. The client 20 may display the error to the user or otherwise handle the error (step 148). Referring again to decision 147, if the server application 102 recognizes the function request, then server application 102 will determine from (access control list or authorization) data base 70 if the user is authorized for the requested function (decision 149). If not, the server application 102 notifies the client to handle the failure (step 150). If so, server application 102 performs the requested function (step 151), and returns the result to the client 20. The client 20 then displays the results to the user or otherwise handles the result (step 152).

Based on the foregoing, a consolidated authentication system and method have been disclosed. However, numerous modifications and substitutions can be made without deviating from the scope of the present invention. For example, instead of using the DH-EKE protocol and SSL session for steps 140–147, the ticket could have been actually sent to authentication function 56 (along with the userID) for authentication. Therefore, the present invention has been disclosed by way of illustration and not limitation, and reference should be made to the following claims to determine the scope of the present invention.

The invention claimed is:

1. A method for a user of a client computer to be authenticated for first and second applications executing in a server, said method comprising the steps of:
   said server authenticating said user for said first application based on a userID and password of said user, and said server returning a token of said authentication to said client computer, said client computer using said token to request a first function performed by said first application;
   said user subsequently requesting a second function performed by said second application, and in response, said client computer determining that said user has not yet been authenticated for said second application and sending a request to said server for an authentication ticket for using said second application;
   in response to said request for said authentication ticket, said server checking said authentication token, and if valid, said server returning an authentication ticket to said client computer; and
   said client computer requesting said second function to said server, said client computer request for said second function including said authentication ticket.

2. A method as set forth in claim 1 further comprising the step of:
   said second application performing said second function based in part on said authentication ticket.

3. A method as set forth in claim 1 wherein said second application confirms validity of said authentication token for said userID before performing said second function.

4. A method as set forth in claim 1 further comprising the step of said server determining that said authentication ticket supplied with said client computer request is valid before said second application performs said second function.

5. A method as set forth in claim 1 further comprising the steps of:
   before said first application performing said first function for said user, said first application checking if said user is authorized for said first function; and
   before said second application performing said second function for said user, said second application checking if said user is authorized for said second function.

6. A method as set forth in claim 1 further comprising the following steps performed after the step of said server checking said authentication token and before the step of said server returning said authentication ticket to said client computer:
   granting a privileged function in said server control of a process running said first application, said privileged function creating said authentication ticket for said user if a valid authentication ticket does not currently exist for said user.

7. A method as set forth in claim 6 wherein if a valid authentication ticket currently exists for said user, said privileged function extending an expiration date of said valid authentication ticket.

8. A method as set forth in claim 1 further comprising the step of establishing an SSL session between said client computer and said server for the step of said client requesting said second function to said server.

9. A client computer and a server to permit a user of the client computer to be authenticated for first and second applications executing in the server, said client computer and server comprising:
   said server including means for authenticating said user for said first application based on a userID and password of said user, and returning a token of said authentication to said client computer, said client computer including means for using said token to request a first function performed by said first application;

in response to said user subsequently requesting a second function performed by said second application, said client computer including means for determining that said user has not yet been authenticated for said second application and sending a request to said server for an authentication ticket for using said second application;

in response to said request for said authentication ticket, said server including means for checking said authentication token, and if valid, returning an authentication ticket to said client computer;

said client computer including means for requesting said second function to said server, said client computer request for said second function including said authentication ticket.

10. A client computer and a server as set forth in claim 9 wherein
said second application performs said second function based in part on said authentication ticket.

11. A computer program product for execution in a client computer and a server to permit a user of the client computer to be authenticated for first and second applications executing in the server, said computer program product comprising:
a computer readable medium;
first program instructions for execution in said server for authenticating said user for said first application based on a userID and password of said user, and returning a token of said authentication to said client computer,
second program instructions for execution in said client computer for using said token to request a first function performed by said first application;
in response to said user subsequently requesting a second function performed by said second application, third program instructions for execution in said client computer for determining that said user has not yet been authenticated for said second application and sending a request to said server for an authentication ticket for using said second application;
in response to said request for said authentication ticket, fourth program instructions for execution in said server for checking said authentication token, and if valid, returning an authentication ticket to said client computer; and
fifth program instructions for execution in said client computer for requesting said second function to said server, said client computer request for said second function including said authentication ticket; and wherein
said first, second, third, fourth and fifth program instructions are recorded on said medium.

12. A computer program product as set forth in claim 11 wherein said second application performs said second function based in part on said authentication ticket.

13. A method for a user of a client computer to be authenticated for first and second applications executing in a server, said method comprising the steps of:

the user furnishing to said server a userID and password, and in response, said server authenticating said user for said first application and returning an authentication token to said client computer;

subsequently said user requesting a first function performed by said first application, said client computer forwarding said request and said authentication token to said server and said first application performing said first function;

subsequently said user requesting a second function performed by said second application;

in response to said request for said second function, said client computer determining that said user has not yet been authenticated for said second application, and sending a request to said server for an authentication ticket for using said second application;

in response to said request for said authentication ticket, said server checking said authentication token, and if valid, said server returning an authentication ticket to said client computer; and said client computer requesting said second function to said server, said client computer request for said second function including said authentication ticket, and said second application performing said second function based at least in part on said authentication ticket.

14. A method as set forth in claim 13 further comprising the following steps performed after the step of said server checking said authentication token and before the step of said server returning said authentication ticket to said client computer:
granting a privileged function in said server control of a process running said first application, said privileged function creating said authentication ticket for said user if a valid ticket does not currently exist for said user.

15. A method as set forth in claim 14 wherein if a valid authentication ticket currently exists for said user, said privileged function extending an expiration date of said valid authentication ticket.

16. A method as set forth in claim 13 further comprising the steps of:
before said first application performing said first function for said user, said first application checking if said user is authorized for said first function; and
before said second application performing said second function for said user, said second application checking if said user is authorized for said second function.

17. A method as set forth in claim 13 wherein the step of said server authenticating said user for said first application comprises the step of said server setuiding said user for said first application.

18. A method as set forth in claim 13 further comprising the step of establishing an SSL session between said client computer and said server for the step of said client computer requesting said second function to said server.

* * * * *